(12) United States Patent
Choi

(10) Patent No.: US 10,694,005 B2
(45) Date of Patent: *Jun. 23, 2020

(54) HARDWARE-BASED PACKET FORWARDING FOR THE TRANSPORT LAYER

(71) Applicant: Akamai Technologies Inc., Cambridge, MA (US)

(72) Inventor: Byung K. Choi, Boston, MA (US)

(73) Assignee: Akamai Technologies Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,641

(22) Filed: Sep. 26, 2018

(65) Prior Publication Data

US 2019/0089818 A1 Mar. 21, 2019

Related U.S. Application Data

(63) Continuation of application No. 14/548,792, filed on Nov. 20, 2014, now Pat. No. 10,135,956.

(51) Int. Cl.
| | |
|---|---|
| H04L 29/06 | (2006.01) |
| H04L 12/741 | (2013.01) |
| H04L 12/807 | (2013.01) |
| H04L 12/801 | (2013.01) |
| H04L 29/12 | (2006.01) |

(52) U.S. Cl.
CPC ............ *H04L 69/161* (2013.01); *H04L 69/22* (2013.01); *H04L 45/74* (2013.01); *H04L 47/193* (2013.01); *H04L 47/27* (2013.01); *H04L 61/2503* (2013.01)

(58) Field of Classification Search
USPC ......................................................... 370/401
See application file for complete search history.

(56) References Cited

U.S. PATENT DOCUMENTS

| | | |
|---|---|---|
| 10,084,855 B2 | 9/2018 | Choi |
| 10,091,104 B1 | 10/2018 | Choi |
| 10,193,782 B1 | 1/2019 | Choi |
| 10,313,270 B1 | 6/2019 | Choi |
| 2019/0082027 A1 | 3/2019 | Choi |

OTHER PUBLICATIONS

U.S. Appl. No. 14/458,792.
Information Disclosure Statement With Communication Under MPEP § 609.02, letter of Aug. 22, 2018, 2 pages.

*Primary Examiner* — Natasha W Cosme

(57) ABSTRACT

This document describes, among other things, improved methods, systems, and apparatus for relaying packets on computer networks. Preferably, the relay function is accelerated at a host by implementing selected forwarding functions in hardware, such as the host's network interface card, while upper software layers at the host retain at least some access to the packet flow to handle more complex operations and/or monitoring. In a so-called "split TCP" arrangement, for example, a relay host terminates a first TCP connection from a given host and forwards packets on that connection to another given host on a second TCP connection. The relay host has a TCP forwarding table implemented at the device level, configurable by a relay management application running in the kernel or user-space. Special forwarding table modes may be used to enable full-TCP protocol support while also taking advantage of hardware acceleration.

16 Claims, 10 Drawing Sheets

HARDWARE-BASED PACKET FORWARDING FOR THE TRANSPORT LAYER

BACKGROUND

Technical Field

This patent document relates generally to distributed computer systems and to computer-to-computer communication via computer networks.

Brief Description of the Related Art

Internet-scale distributed systems and applications often use one or more transport layer relays for long network latency connections. The relay manages two connections to connect (splice) the two different connection segments, which is also called a "split TCP" arrangement. The goal is to achieve higher end-to-end throughput, lower response time, and higher reliability than one long single-segmented connection can provide.

For example, a content delivery network (CDN) platform may use TCP relays. A CDN may be considered an overlay across the Internet on which communication efficiency can be improved. Improved communications on the overlay can help when a proxy server in the CDN needs to obtain content from an origin server, or otherwise when accelerating non-cacheable content for a content provider customer. Communications between CDN servers and/or across the overlay may be enhanced or improved using transmission control protocol (TCP) splicing to effect improved route selection, protocol optimizations including TCP enhancements, persistent connection reuse and pooling, and other techniques such as those described in U.S. Pat. Nos. 6,108,703, 6,820,133, 7,274,658, 7,607,062, and 7,660,296, among others, the disclosures of which are incorporated herein by reference. The CDN overlay (and ability to relay packets) may also be leveraged for WAN optimization. In such cases, CDN appliances or software executing in customer branch offices can connect through the overlay to third party Internet hosted applications and resources, and/or to applications and resources at a customer central data center, the latter providing an accelerated corporate intranet.

FIG. 1 shows a typical connection relay with two end-points (Hosts 100 and 104) and an intermediate node 102. The two hosts are transferring data. It is known in the art that, if the hosts 100, 104 are far away from each other such that the network latency between them is rather high, placing an intermediate host 102 between them as a relay between two connection segments, and routing data through this host, often helps achieve higher end-to-end performance. This is referred to as "split connections" or, for the common case of using TCP for transport layer communications, as the aforementioned "split TCP". The use of the relay tends to enhance performance because of the recovery cost of packet loss in reliable data transfer algorithms like TCP. In short, the recovery cost on either one of segments (Connection 106 and Connection 108) is lower than that on Connection 110. Another factor in the end-to-end performance is the connection establishment time, especially for transmission of data units comparable to the size of TCP congestion window. It is preferable to use persistent connections where possible to optimize the end-to-end performance.

To better understand split TCP, consider first the direct model, in which hosts 100 and 104 connect directly. In this model, the connection is established as follows:

1) Host 100 sends a connection request to Host 104
2) Host 104 accepts the connection request from Host 100
3) Host 100 creates an end point for the connection
4) Host 104 creates an end point for the connection
5) Both Host 100 and 104 agrees on the TCP parameters for subsequent data transfer via the connection
6) The connection between the Hosts 100, 104 is now established. The connection comprises an exclusive end point at Host 100, an exclusive end point at Host 104, and a set of parameters both hosts agreed upon to coordinate subsequent data transfer between them.

This general TCP connection model for the direct case does not dictate the order of events, however. For implementation purposes, the end point allocation may happen either before or after the mutual agreement on the parameter values. Details can be found in the related IETF standards documents.

FIG. 2 illustrates the split TCP case. In this model, the connections are established as follows:

1) Host 100 establishes a connection 106 with Host 102, following the procedure of the direct model.
2) In the subsequent data transfer mode, Host 100 sends a message to Host 102 that Host 100 needs to communicate with Host 104 via Host 102, or sends data that Host 102 understands must be forwarded to a further destination (e.g., Host 104 or someplace further down the line). Note that it is not necessary that Host 100's intention of communicating with Host 104 has to occur after establishing connection 106; such an intention can be introduced to the connection request from Host 100 to Host 102.
3) Host 102 establishes a connection 108 with Host 104, following the procedure of the direct model.
4) Host 102 begins splicing the two connections 106 and 108. Each connection 106, 108 will have an independent set of values for the TCP parameter set. Both connections are terminated at Host 102.

In the final form of spliced TCP, there are two split TCP connections as shown in FIG. 2. Importantly, the splicing functionality is dealing with the two TCP end points at Host 102 to connect (splice) the two connections 106, 108.

FIG. 3 illustrates, in an abstract form, a typical implementation of the relay at node 102. As can be seen, each incoming packet from one connection at the NIC (Network Interface Controller) at node 102 proceeds to the relay module at the application layer through all the intermediate layers to be spliced to the other connection. Once the packet reaches the relay host, its header information is changed (connection ID, IP address and port number, and status information from one connection to the other), and the packet is subsequently sent down back to the NIC, where it is forwarded to the next hop.

The selection of Host 102 as the chosen relay from amongst a set of candidate intermediate nodes is typically determined by a global routing function, and the selection of the next hop is too. Examples include CDN mapping and routing mechanisms that return candidate machines for a given DNS lookup. A distributed entity of such global routing functions is shown in FIG. 3 as "Router/Relay".

This model incurs overhead at each layer that the packet traverses, both up and down the stack. For example, each packet received by NIC must be copied into the kernel and then to user-space. Each packet copied to the kernel from NIC comes with an interrupt, which necessarily incurs a context switch (incurring CPU overhead). A copy from the kernel to user-space comes with a software interrupt, which also incurs a context switch.

While Internet Protocol (IP) layer and lower layer forwarding in hardware may be relatively straightforward, doing so for reliable transport layer communications is not. The reliability guarantees offered by TCP introduce message complexity and requirements for keeping state that are beyond existing forwarding table implementations. And while it is known to implement TCP in a network interface card, such implementations are inflexible and expensive, and do not address the need to manage packet forwarding, e.g., for determining where to send a given flow.

There is a need for improved packet relay efficiency at relay nodes in the split connection and/or split TCP scenario. The teachings herein address these needs and also provide other benefits and improvements that will become apparent in view of this disclosure.

SUMMARY

This document describes, among other things, improved methods, systems, and apparatus for relaying packets on computer networks. Preferably, the relay function is accelerated at a host by implementing selected forwarding functions in hardware, such as the host's network interface card, while upper software layers at the host retain at least some access to the packet flow to handle more complex operations and/or monitoring. In a so-called "split TCP" implementation, for example, a relay host terminates a first TCP connection from a given host and forwards packets on that connection to another given host on a second TCP connection. The determination of where to forward the packets may be done based on local configuration, on platform mapping/routing decisions communicated to the relay host, or otherwise. The relay host preferably has a TCP forwarding table implemented at the device level, configurable by a relay management application running in the kernel or user-space. That relay-management application is typically used to obtain, implement and/or manage platform mapping and routing decisions, and may also handle certain transport layer operations. Special forwarding table modes may be used to enable full-TCP protocol support (including packet receipt acknowledgement, congestion avoidance, retransmit and loss recovery algorithms, and the like) while also taking advantage of hardware acceleration where possible. The teachings hereof also apply to other transport layer protocols, and are compatible with software defined networking approaches. The subject matter described herein has a wide variety of applications in content delivery and online platform architectures.

As a further example, in one embodiment there is disclosed herein a method for relaying packets with a host computer device. The method includes performing certain steps at a host computer device that includes: (i) network interface hardware (e.g., a network interface card) having a forwarding table; (ii) an operating system running on hardware to provide kernel space and user-space, the forwarding table configured by at least one process executing in any of the kernel space and the user-space; and (iii) a transmission control protocol (TCP) stack implementation in any of: the kernel space, the user-space, and the network interface hardware. The steps include receiving a packet over a first TCP connection, via the network interface hardware; determining, based on the forwarding table, a destination for the packet; and sending the packet over a second TCP connection, via the network interface hardware.

The method may also include sending a copy of the packet up to the TCP implementation and/or the at least one process, in some cases synchronously with the sending of the packet over the second TCP connection via the network interface hardware. The method may include determining if a TCP sequence number in the received packet is in-sequence with respect to the first TCP connection, and if not, switching from a first mode of the forwarding table to a second mode of the forwarding table. The method may also include determining, based on the forwarding table, a header change to apply to the packet, such as changing a TCP sequence number, TCP acknowledgement number, window size, and/or checksum. The method may include the host computer device receiving routing information from a remote device and the at least one process using the routing information for configuring the forwarding table. In some cases, the forwarding table may include logic specifying a condition that, when met by a given packet, causes the network interface hardware to copy subsequent packets up to the at least one process. The at least one process may provide and/or communicate with the TCP protocol stack implementation. The method may be implemented in computer devices and systems, which will be described herein.

As those skilled in the art will recognize, the foregoing description merely refers to examples of the invention for introductory purposes. The specific scope and applicable summary of the invention is provided solely by the appended claims, which are hereby incorporated by reference.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." The teachings hereof may be realized in a variety of systems, methods, apparatus, and non-transitory computer-readable media.

Figure 1:
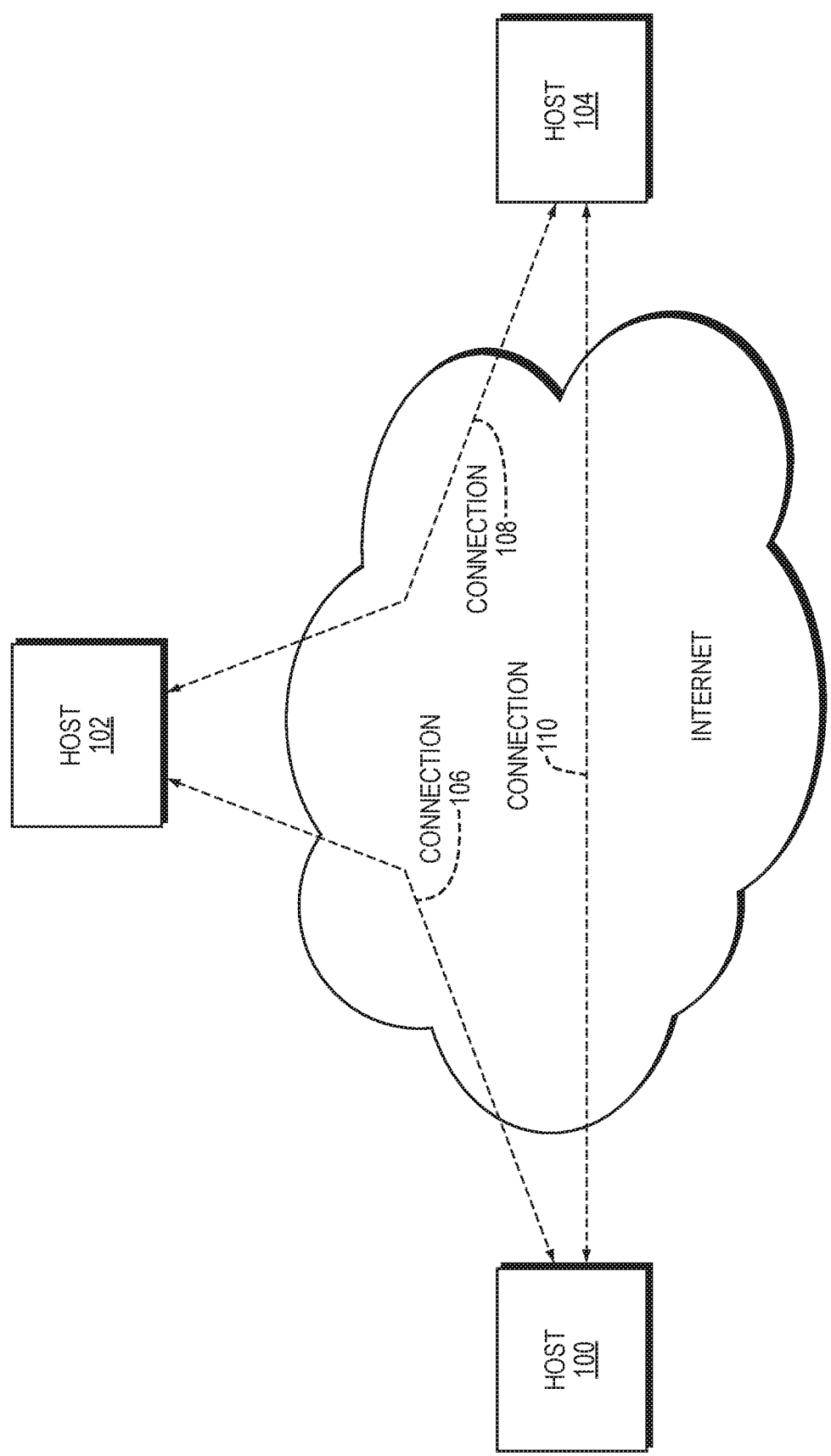
FIG. 1 is a schematic diagram illustrating a connection directly between two endpoint hosts compared to a split connection model with relay node in between the endpoint hosts.
Figure 2:
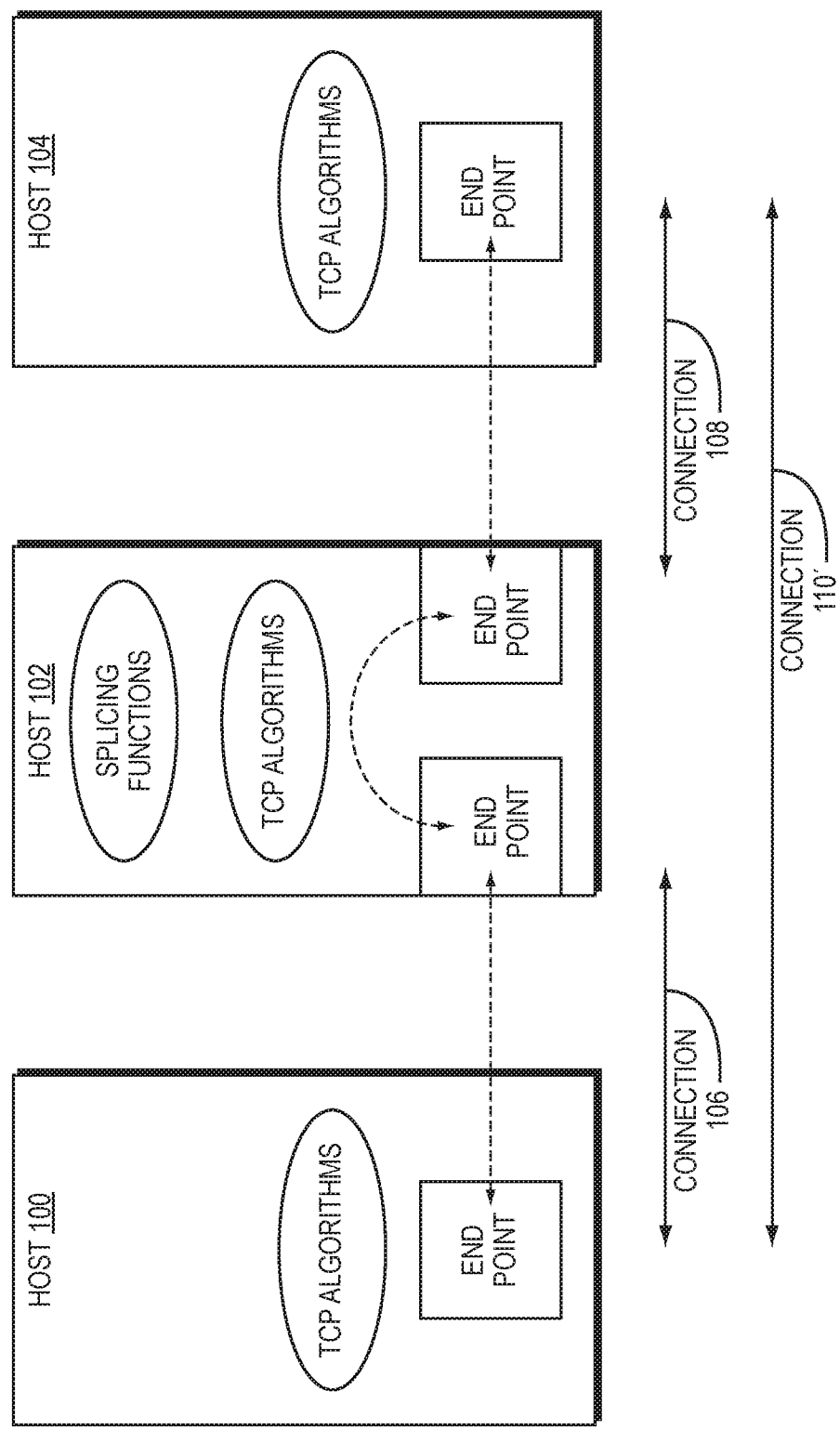
FIG. 2 is a schematic diagram illustrating a split connection model.
Figure 3:
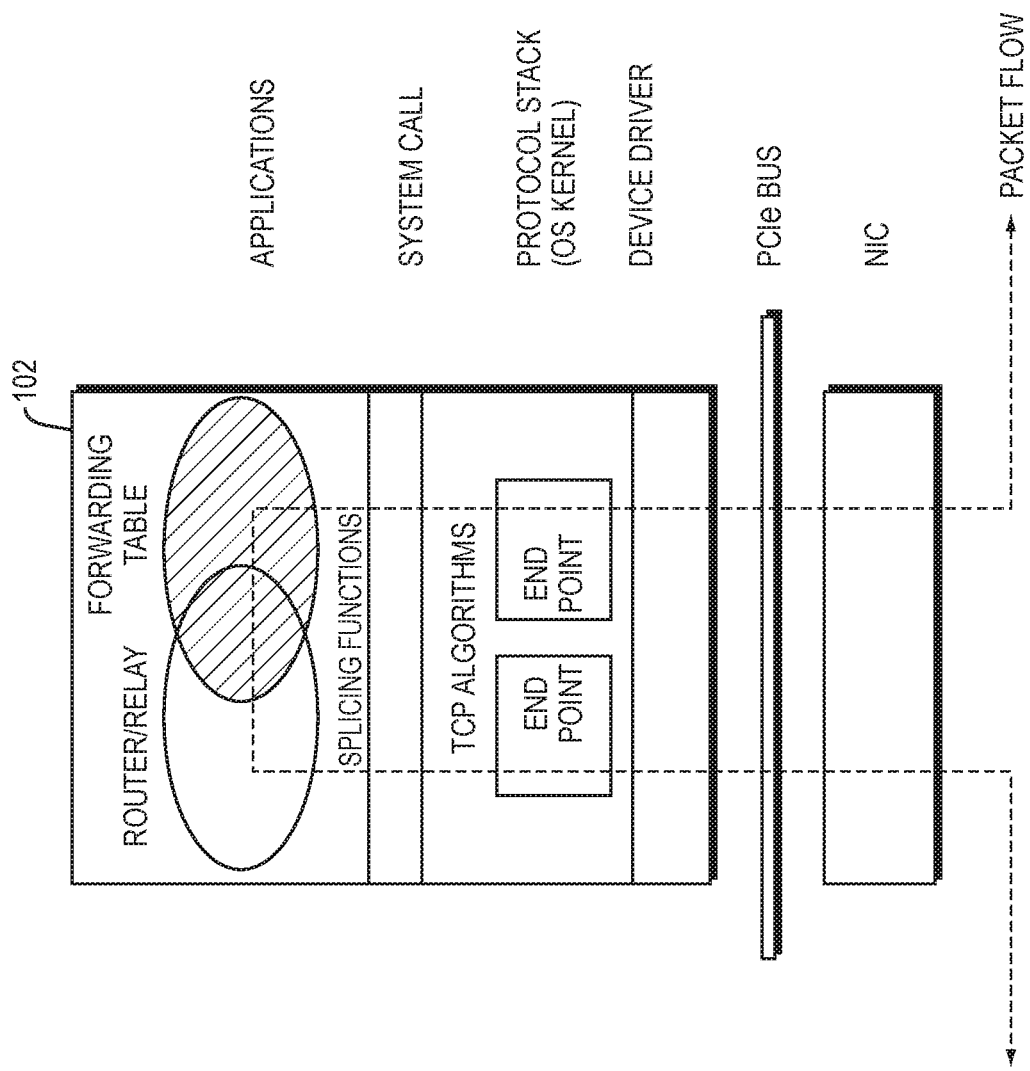
FIG. 3 is a schematic diagram illustrating components at the relay node shown in FIG. 2.
Figure 4:
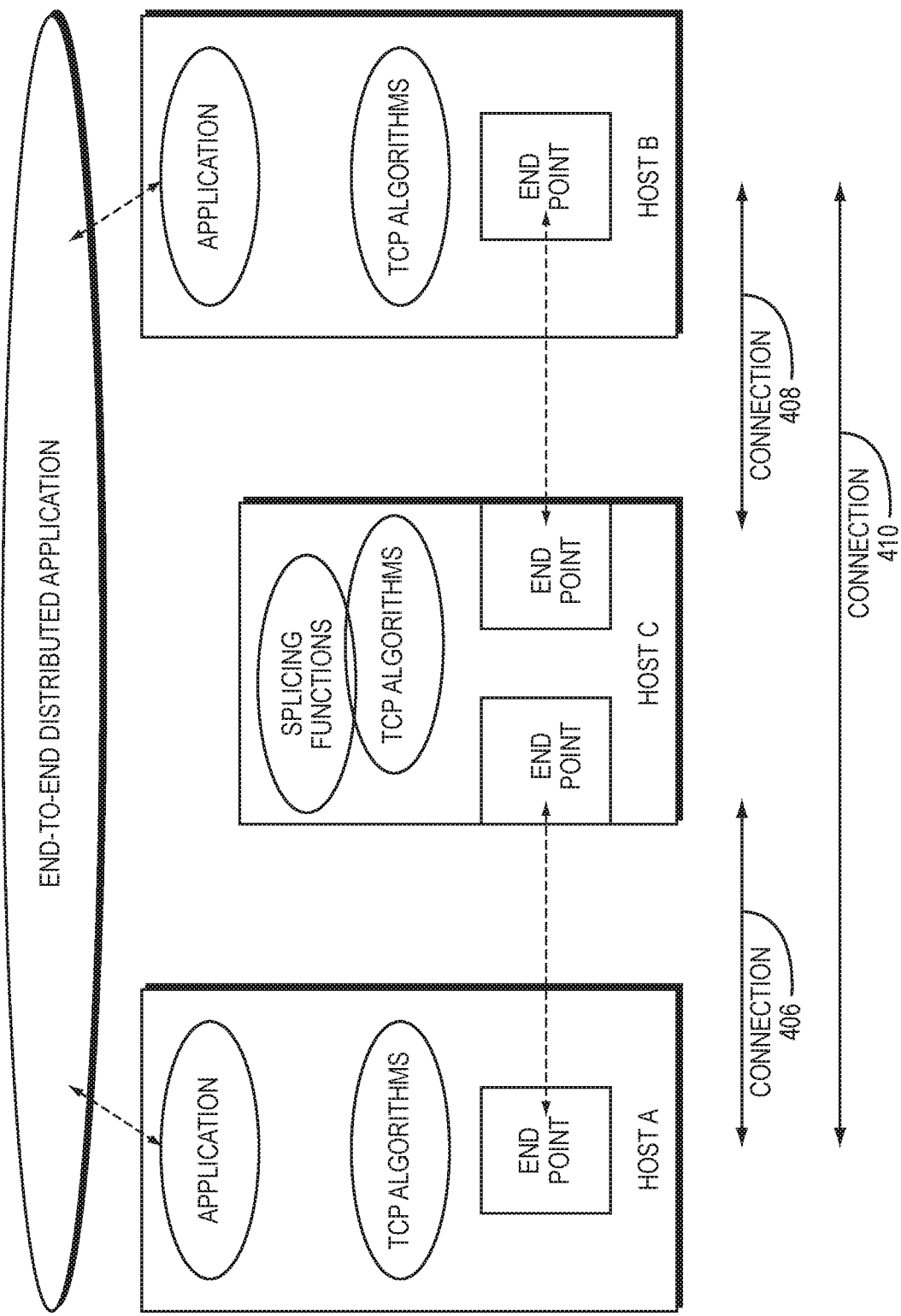
FIG. 4 is a schematic diagram illustrating a split connection model in accordance with the teachings hereof.

FIG. 4 illustrates a split TCP topology, with Host A sending data to Host B via relay Host C. Two separate TCP connections are shown as connections 406, 408. To higher computing layers, the logical connection appears as single connection 410. As those skilled in the art will understand, any number of intermediate relay hosts might be employed to create the logical connection.

In this example, the hosts cooperate to deliver a service to an end user client device in a distributed manner. A web application (HTTP/S) is one example. The endpoints might be an end-user client device and a data center of a SaaS provider that is offering a cloud service or platform to consumers. Alternatively, the endpoints might be a client device in a branch office connecting across a WAN and an application hosted at an enterprise data center. Alternatively, the endpoints shown in FIG. 4 may be endpoints on an overlay network, with Host A acting as a proxy connected on the left-hand side to an end-user client device, and Host B connected to an origin server hosting an application on the right hand side. These are all merely examples. The distributed application is not aware of the way the underlying connections are constructed and run, or whether they are a single or multiple spliced connections. Similarly, the splicing functionality in Host C is not aware of the context of the application.

Figure 5:
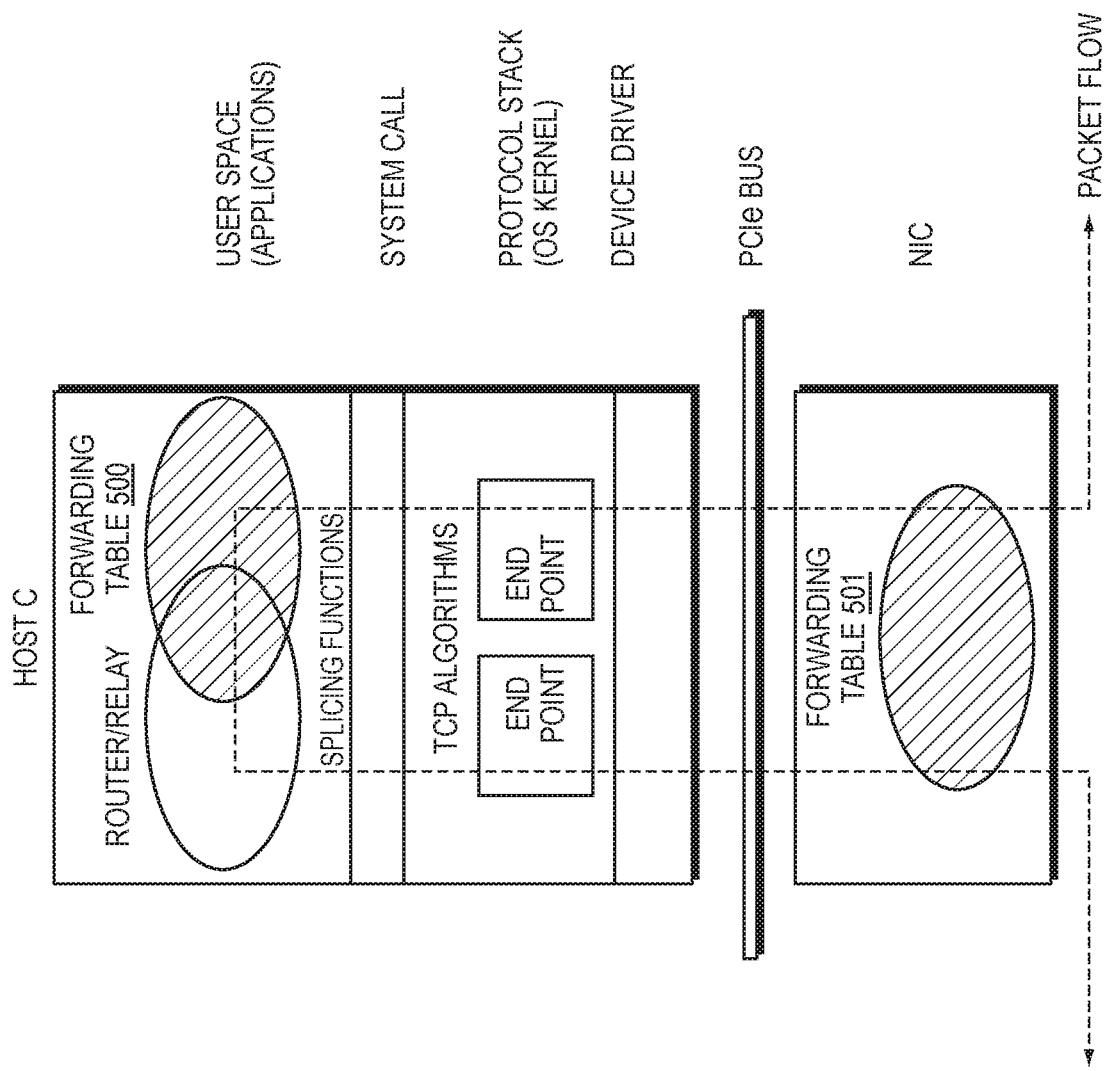
FIG. 5 is a schematic diagram illustrating components at the relay node shown in FIG. 4.

FIG. 5 illustrates an embodiment of the relay (Host C) in more detail. The user-space layer contains certain splicing-related applications, notably the router/relay function and a forwarding table 500 generated by the router/relay function. The router/relay function obtains and implements platform routing, generates and manages the forwarding table, and generally manages the relay function. The router/relay function together with the forwarding table is referred to below as the 'relay application,' for convenience.

FIG. 5 also shows a forwarding table 501 at the hardware level, and specifically in this example, at the NIC. As will explained in more detail later, either of forwarding table 500 or 501 might be used depending on the mode of operation at a given point in time; generally these two can work in conjunction. Forwarding table 501 might be thought of as providing hardware device-level relay functions in concert with the user-space-layer relay functions. Note that the user space relay application might be any runtime process, including a daemon, or otherwise. In an alternate embodiment, some or all of relay function shown in FIG. 5 could be moved to the system and to a kernel process, and/or combined with a TCP implementation at Host C.

The user-space relay application and the hardware device-level Forwarding table 501 in Host C preferably work together to provide Layer 4 connection relay services regardless of the number of connections involved and the exact nature of application-layer-data being transported. Due to the nature of the application being delivered and the limited size of connection packet (maximum transfer unit of TCP, for example), it is possible that one application-layer message exchange can easily cause multiple Layer 4 packets through Host C. More specifically, initiating a new application session is effectively a new request of multiple spliced Layer 4 connections followed by subsequent Layer 4 packet relay requests.

At the time of new application layer request, a Layer 4 relay such as Host C is preferably capable of creating forwarding information from the global routing entity such that subsequent Layer 4 packet relay services for the same session can be performed by looking up in the forwarding table. Therefore, preferably the content and size of the forwarding table is dynamic. Further, the forwarding table is preferably able to change the Layer 4 packet header information.

In sum, the relay Host C's splicing functions consists of two sub functionalities in this embodiment:
1) routing protocols and algorithms (e.g., as calculated locally or obtained from a wide-area or global routing/mapping system, e.g., by DNS lookup or otherwise) that access the outcome of the routing and/or participate in it
2) mechanical forwarding activities based on the readily available forwarding table, rules for Layer 4 packet header change, and other rules Within relay Host C, the routing protocols and algorithms (intelligence) are kept at the application layer, while the repeated mechanical forwarding activities with the forwarding table (passive task) are relocated down to the NIC level device (i.e., to forwarding table 501) when possible.

In accordance with the teachings hereof, the user-space relay application provides quick and easy change of the routing protocols algorithms (intelligence policies) at runtime. The Layer 4 splicing at the NIC level reduces the relay overhead by reducing the need to access the system and other layers in Host C.

The device level forwarding table 501 may be designed in many different ways. The forwarding table below shows a simplified example. The forwarding table generally tends to grow in size and complexity as the traffic served by the relay diversifies.

TABLE I

Forwarding Table

| Matching Fields Info | value | mode | next hop | rules | count | conditional |
|---|---|---|---|---|---|---|
| TCP Header | header value | branch | IP addr and port number | header update rules | total matches | advanced |
| UDP Header | header value | fast | IP addr and port number | header update rules | total matches | advanced |
| Default | null | controller | local host IP | No change | number of no-matches | null |

Figure 6:
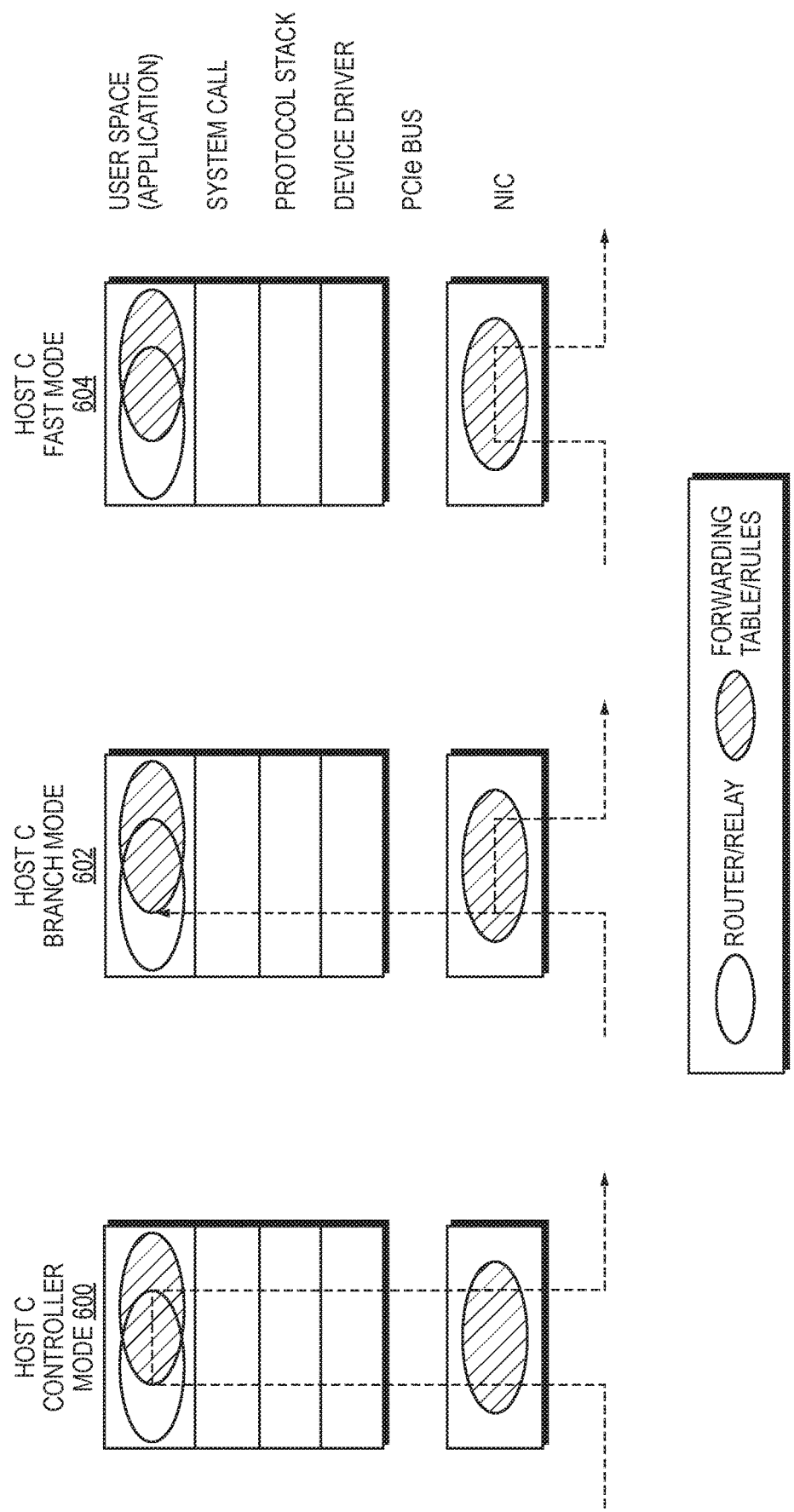
FIG. 6 is a schematic diagram illustrating different modes of operation for the relay host and forwarding table shown in FIG. 5.

In one embodiment, the relay Host C supports the following operation modes, which are illustrated in FIG. 6:

Controller Mode (600)

In this mode, all incoming packets are forwarded to the application in the user-space layer so that the relay can inspect every incoming packet to exercise routing/relay functions on them (determining next hop with mapping, setting up billing/logging, etc.). Preferably, packets belonging to the categories below are served in this mode:
- a) control packets like those for TCP connection establishment and teardown
- b) out-of-sequence data packets for delivery guarantee traffic like TCP flows
  - i) duplicate packets, whose sequence numbers are lower than the expected
  - ii) ahead-of-sequence packets, whose sequence numbers are higher than the expected Branch Mode (602)

In this mode, incoming packets are copied to the TCP implementation and potentially continue up to the relay application, while at the same time the packet is relayed directly to the next hop from the NIC level device. Preferably, packets belonging to the categories below are served in this mode:
- a) in-sequence packets for delivery guarantee traffic like TCP flows, whose sequence numbers match the expected numbers Fast Mode (604)

In this mode, all incoming packets are mechanically forwarded to the next hop, without needing to be copied to the relay application. Preferably, packets belonging to the categories below are served in this mode:

level forwarding can be kept relatively free of this complexity. As mentioned, the packets copied to the TCP implementation in branch mode may or may not travel all the way to the user-space relay application (assuming a user-space implementation of the relay application), depending on the situation. For example, for a pure level 4 switching mode, the TCP stack might handle the traffic itself, e.g., for acknowledgements and other functions. However, if there is a need for deep packet inspection or application layer service on the packets (e.g., requiring encryption/decryption or compression/decompression), then they can travel up to the relay application. Other reasons to copy the packets up include enabling the user-space relay application to be aware of and monitor status of the flow and/or log the traffic.

Note that the delivery guarantee property is conserved for the two connections being spliced independently of each other in this mode because only the in-sequence packets are subject to automatic forwarding. Out-of-sequence packets will be queued until the sequence gap is filled by the TCP algorithms.

Branch mode involves header information change between incoming and outgoing packets, as they belong to two separate connections. With the setup of FIG. 4 and assuming an HTTP response scenario (below in this section, Host B response to Host A via Host C), Table II below shows an example list of rules for the device-level forwarding table, dictating which field of TCP packet header information changes between incoming and outgoing packets at the relay. The values for the rules are preferably set up at the time of branch mode entry addition to the forwarding table.

TABLE II

TCP Header Change Rules

| Information Field | Incoming | Outgoing |
| --- | --- | --- |
| Source IP Address | IP Address of Host B | IP Address of Host C |
| Destination IP Address | IP Address of Host C | IP Address of Host A |
| Source Port Number | Port (End Point) Number of Host B for Connection 408 | Port (End Point) Number of Host C for Connection 406 |
| Destination Port Number | Port (End Point) Number of Host C for Connection 408 | Port (End Point) Number of Host A for Connection 406 |
| Sequence Number | TCP Packet Sequence Number assigned by Host B to packets sent to Host C through Connection 408 | TCP Packet Sequence Number assigned by Host C to packets sent to Host A through Connection 406 |
| Acknowledgement Number | TCP Packet Sequence Number Host B expects from Host C for receipt through Connection 408 | TCP Packet Sequence Number Host C expects from Host A for receipt through Connection 406 |
| Window Size | Receive Buffer Size of Host B for Connection 408 | Receive Buffer Size of Host C for Connection 406 |
| Checksum | Checksum of Head and Data of Sending-Packet through Connection 408 computed by Host B NIC-level device | Checksum of Head and Data of Sending-Packet through Connection 406 computed by Host C NIC-level device | a) packets for non-delivery-guarantee traffic like UDP

Branch mode can provide a performance gain for delivery guarantee traffic because this mode still allows the TCP stack and/or relay application to keep tracking the flow status while letting the NIC level device to deliver fast forwarding. In other words, in branch mode the TCP implementation (working with the relay application as necessary) can still handle such backward facing communications (i.e., from Host C to Host A) as TCP acknowledgements, congestion control and loss recovery packets. In this way, the hardware For fast mode, a performance gain for non-delivery-guarantee traffic comes because this mode allows the user-space relay application (in this example) to be free of tracking the flow status by letting the NIC level device to deliver fast forwarding even without copying the packet to the kernel. Following the same example above, FIG. 4 and assuming the HTTP response scenario now in UDP (Host B to Host C to Host A), Table III shows an example list of rules for UDP header information change in the fast mode at Host C.

TABLE III

UDP Header Change Rules

| Information Field | Incoming | Outgoing |
| --- | --- | --- |
| Source IP Address | IP Address of Host B | IP Address of Host C |
| Destination IP Address | IP Address of Host C | IP Address of Host A |
| Source Port Number | Port (End Point) Number of Host B for the application | Port (End Point) Number of Host C for the application |
| Destination Port Number | Port (End Point) Number of Host C for the application | Port (End Point) Number of Host A for the application |
| Checksum | Checksum of Head and Data of Sending-Packet for the application computed by Host B NIC-level device | Checksum of Head and Data of Sending-Packet for the application computed by Host C NIC-level device |

Operational Examples

Assume for purposes of illustration an HTTP application running over TCP, and assume a split TCP connection as described above. The following is a description of one embodiment of an operational flow in this scenario:
1) HTTP request: upon reception of an HTTP request from Host A, the relay (Host C) performs:
   a) looking up the next node (Host B) from the global routing information,
   b) creating a TCP connection with the next hop (Host C to Host B) if there is no existing TCP connection (e.g., persistent connection) available between them,
   c) creating two forwarding entries at the application layer, one for possible subsequent TCP data units belonging to the same HTTP request message (Host A to Host B via Host C and TCP header change rules); and one for possible subsequent TCP data units belonging to the same HTTP response message (Host A from Host B via Host C and TCP header change rules)
   d) copying these new forwarding entries down to the NIC level device
2) continued HTTP request: upon reception of another TCP data unit from Host A, the relay (Host C) performs:
   a) the TCP header matches one entry of the forwarding table at the MC,
   b) the TCP header is changed by the header change rules of the matching entry,
   c) if the mode is branch, the header-changed TCP packet is copied to up to the relay application control plane while it is directly forwarded to the next hop,
   d) otherwise serve the packet in the controller mode
   e) increase the match count by one
3) HTTP response: upon reception of a TCP data unit belonging to the corresponding HTTP response from Host B, the relay (Host C) performs:
   a) the TCP header matches one entry of the forwarding table at the MC,
   b) the TCP header is changed by the header change rules of the matching entry,
   c) if the mode is branch, the header-changed TCP packet is copied to the control plane while it is directly forwarded to the next hop,
   d) otherwise serve the packet in the controller mode
   e) increase the match count by one
4) Upon reception of the last TCP data unit of the corresponding HTTP response, the relay (Host C) performs:
   a) the regular relay activities described above at 3),
   b) if the local connection policy requires, sending the matching-entry destruction instructions down to the NIC, destroying the matching-entry at the application layer, destroying the two TCP connections,
   c) if not, the matching-entry is kept until the connection management policy dictates otherwise when the system resource is exhausted, a priority scheme makes a decision about which connections survive and which don't.

Because the relay Host C splices two TCP connections, the TCP header needs to change when a TCP packet travels from one leg to another through the relay. As the TCP header information fields are all standardized, the relay Host can exchange the information field values from the two legs. In addition, the sequence number and acknowledge number needs to properly change following the standard rules (IETF RFCs).

The operational example provided above is within the context of an HTTP message exchange. It should be understood that the teachings hereof are not limited to HTTP but rather extend to any application layer messages that can produce multiple packets. Messages flowing through the relay may represent SIP protocol setups, audio/video streaming, and otherwise. Further, the application may be a routing application used specifically to handle packet routing through an overlay network such as is provided by a CDN (e.g., a packet handling service that encapsulates and sends entitled packets via the overlay).

Network Interface Card

A modern NIC is typically designed with multiple embedded, on-board memory, packet-processing ASICs, Ethernet interface hardware, and an embedded real-time operating system to manage all of these resources. Such resources can be leveraged to handle the forwarding table processing and in general the packet processing load entailed by the modes described above.

In some cases, a NIC is powerful enough that one physical NIC may support multiple hosts (I/O virtualization). This is compatible with the teachings hereof. A single NIC, with a forwarding table accessible to each of the multiple hosts (or a forwarding table for each host) can be used to provide a hardware level relay function, while still sending packets up the stack of the appropriate host in controller mode and branch mode.

As an optimization for the NIC forwarding table, hash functions can be used for fast table entry matching purposes. In addition, the forwarding table at NIC can be implemented with CAM (content addressable memory) to further improve the relay performance. Using CAM is a known engineering method for switches and routers in an effort to support packet processing (packet header information matching and finding the output port) at line speed.

As those skilled in the art will appreciate, the teachings hereof apply to network interface hardware generally, and especially wherever the functions of a network interface card may be implemented, regardless of form factor or the particular componentry and/or configuration of the hardware, either now or in the future.

Communication Between Host and NIC

To configure and modify the forwarding table, a communication channel is provided between the NIC and the user-space relay application (e.g., the "Router/Relay" of FIG. 5-6). The user-space relay application typically creates and deletes entries in the forwarding table using this channel.

There are a variety of ways to do this. In one embodiment, the handling application can use the "ioctl" function provided by device drivers. Using the "ioctl" function, one would create a set of functions required for the new communication. The new communication preferably covers the core set of dictionary-style operations including "add," "read," "delete," "test" of entries plus any other implementation specifics. The NIC would implement the new communication at the low end of "ioctl", while the high end would define new interfaces for local operating systems.

Software Defined Networking

One implementation of the teachings hereof involves leveraging software-defined-networking (SDN). Software defined networking separates the control plane and data plane of networking devices, such as switches, routers, and other devices. A controller handles the routing and traffic shaping policies. For a given data flow, the controller configures and manages data flow through the devices by configuring them to forward packets appropriately. The configuration is typically communicated to the network devices through an API (such as OpenFlow, a known standard).

The teachings hereof can be used to extend software-defined networking to Layer 4 processing with support for delivery-guarantee traffic, including the full suite of higher-order, stateful TCP operations (including congestion control, loss recovery, etc.). The teachings hereof preferably enable SDN network devices to terminate TCP connections for TCP splitting/relay purposes.

Along these lines, in some embodiments the relay Host C shown in FIGS. 5-6 may be an SDN-enabled networking device with an API providing a communication channel between the user-space relay application (acting as SDN controller) and the forwarding table 501 down in the NIC/hardware (acting as SDN data plane). Further, the relay user-space relay application and the forwarding table 501 may reside in different hosts, communicating via that API. In this way, a single relay application (such as a CDN mapping component) can configure and/or control the routing through a set of split TCP relay nodes (such as CDN relay nodes in an overlay network, see e.g., U.S. Pat. No. 7,660,296, the teachings of which are incorporated herein by reference) to facilitate packet transport across one or more computer networks.

Figure 7:
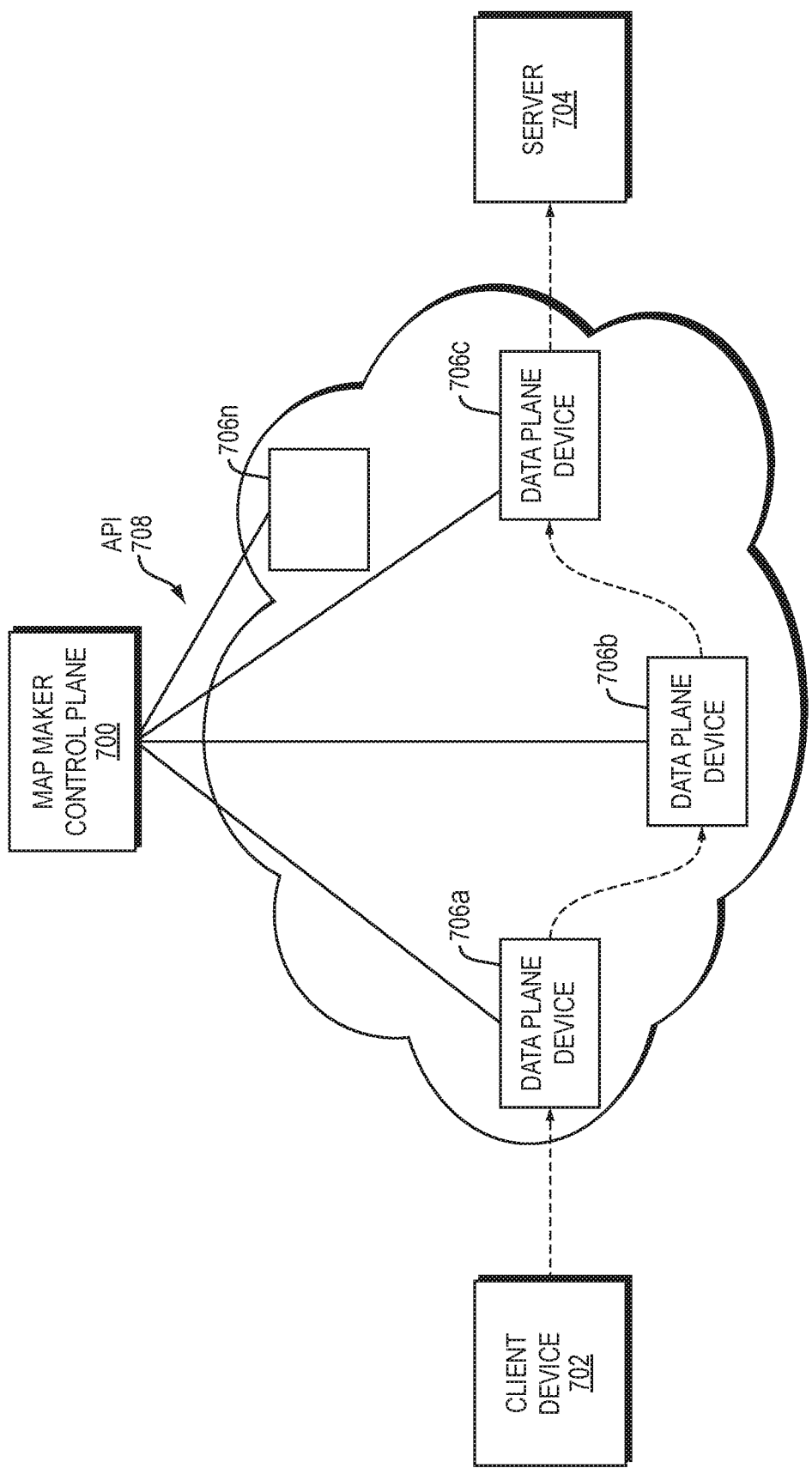
FIG. 7 is a schematic diagram illustrating a system with a control plane device and data plane devices that relay transport layer packets across an overlay network, in accordance with the teachings hereof.

FIG. 7 illustrates an embodiment of an SDN system for an overlay network, in accordance with the teachings hereof. FIG. 7 shows a control plane device 700 that has a platform view of network conditions and congestion, network latencies between the other devices, device load, network link costs, device status, etc. The control plane device 700 calculates mappings so that flows sent from a client device 702 through the overlay can be routed optimally across the overlay to a destination (an application server 704, in this example). Three data plane devices 706a-c are shown and represent a portion of the overlay; they establish independent TCP connections between them and/or maintain persistent connection pools. Data plane device 706n is illustrated as a currently unused data plane device. The data plane devices have configurable forwarding tables as described above. The packets sent by the client are ingested at data plane device 706a, either by DNS aliasing, interception, or otherwise. The packets are routed across the overlay, with the "next hop" at each device being determined by the control plane device 700 routing information, which flows across API 708 to the data plane devices. Where possible, the branch and fast mode accelerations are used to relay packets at the devices. Note that the data plane devices 706a-c may be routers, switches, or in some embodiments, caching proxy servers such as are deployed in content delivery networks, or a mixture of the above.

Advanced Features

In some situations, it is desirable to dynamically change the mode in which the relay Host C operates. The conditional field of the forwarding table (Table I above) may be leveraged to provide this dynamic mode control function, in some embodiments. The conditional field may reference logic that changes the mode upon certain conditions being met. For example, an operation can be set in the conditional field to change the mode to "controller" per FIG. 6, if a gap is found in the TCP header sequence number. When this happens, the relay Host C can refrain from immediately forwarding packets with a gap in sequence number. As a result, congestion at Host C (or more particularly, congestion on the link to Host C) is held at Host C. The packet loss event would not automatically propagate to the next TCP leg. The TCP congestion control algorithms and loss recovery algorithms in Host C's TCP stack could then function to address the loss. The operation mode would change back to, for example, "branch" mode, once the loss is recovered by the relay Host C.

As another enhancement, the frequency of acknowledgement of packet reception at Host C can be controlled by utilizing the "count" and "conditional" fields of Table I together. For example, an operation can be set in the conditional field specifying that: "generate an ACK packet, and send it back to the sender (Host B) when the count field is divisible by 2". The rules of TCP header change for acknowledgement packet will be similar to those header change rules specified in Table II. The NIC can then implement those rules to produce the ACK packet, the ACK packet being populated with flow status and other information in accordance with the existing standards specified in the relevant RFCs. The header change rules could be setup at the time of branch mode entry addition to the forwarding table.

The use of a hardware-level forwarding table has the potential to provide a variety of advantages. The CPU overhead may be lower, for example—particularly in the fast mode but in all modes to some extent. Because the CPU time is lower, the nodes may be able to achieve higher end to end throughput, and more predictability in network latency (i.e., less network jitter) since the time at the relay node is subject to fewer variables. These and other potential advantages, it should be understood, are merely possibilities and realizing them in whole or in part is not necessary to practice the teachings hereof.

Implementation with TCP Offloading

Figure 8:
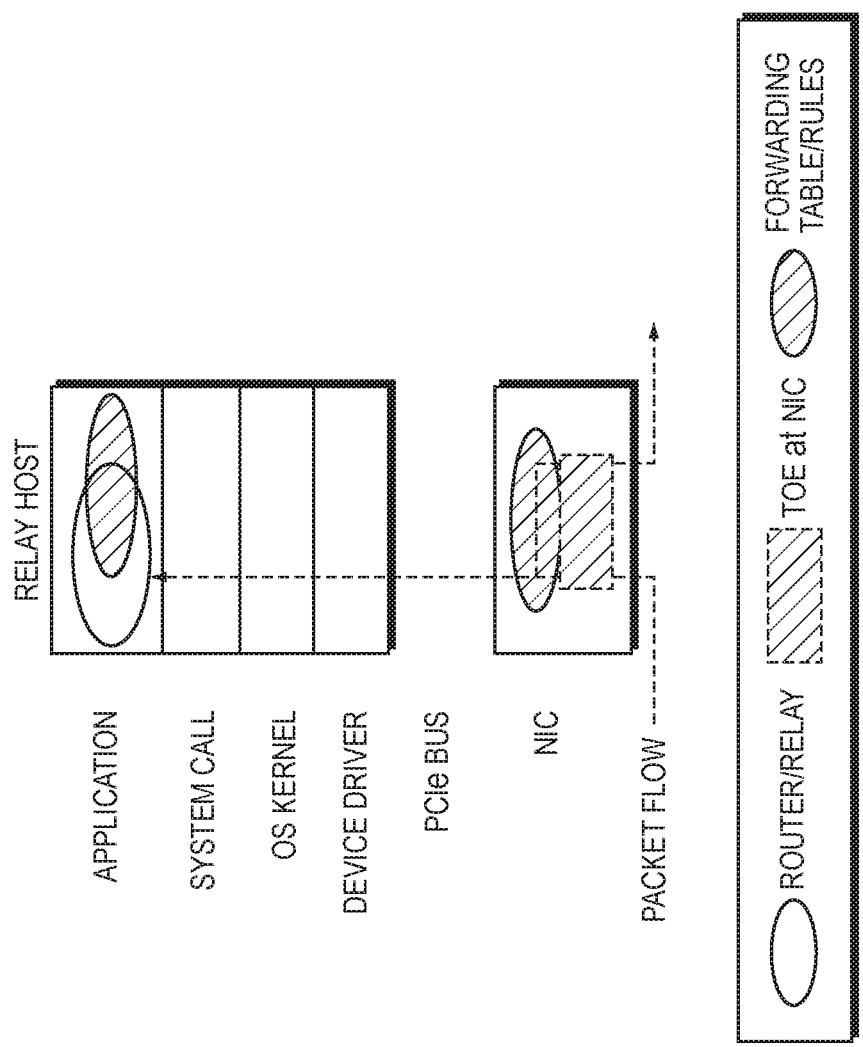
FIG. 8 is a schematic diagram illustrating an implementation of the teachings hereof in conjunction with an implementation of a TCP stack in network interface hardware.

In some embodiments, the relay Host can employ a NIC that implements TCP offloading, e.g., by implementing the TCP protocol stack in the NIC. The teachings hereof are compatible with this approach. FIG. 8 illustrates such an implementation, in which the hardware-level forwarding table is implemented in the NIC with the TCP protocol (the TCP offloading engine or "TOE") and works in conjunction with it, under the control the of the user-space relay application, as described above.

CDN Transport Platform Use Cases

The teachings hereof may be applied, without limitation, in content delivery platforms and in data transport overlays and mechanisms utilized in such platforms, such as those mentioned earlier. The use cases include an edge server obtaining content from an origin server, e.g., through a parent proxy server (which implements a split TCP relay); accelerating non-cacheable content in such scenarios; payload-agnostic data transport services (including real-time messaging/multimedia/peer to peer communications agnostic to higher layer, and including where layers above TCP/IP are encrypted and/or inaccessible to the overlay); wide area network optimization (e.g., with WAN traffic traversing the overlay and relays); virtual private network, and others. Thus the application layer traffic being transported may vary widely and is not limited by the teachings hereof.

Figure 9:
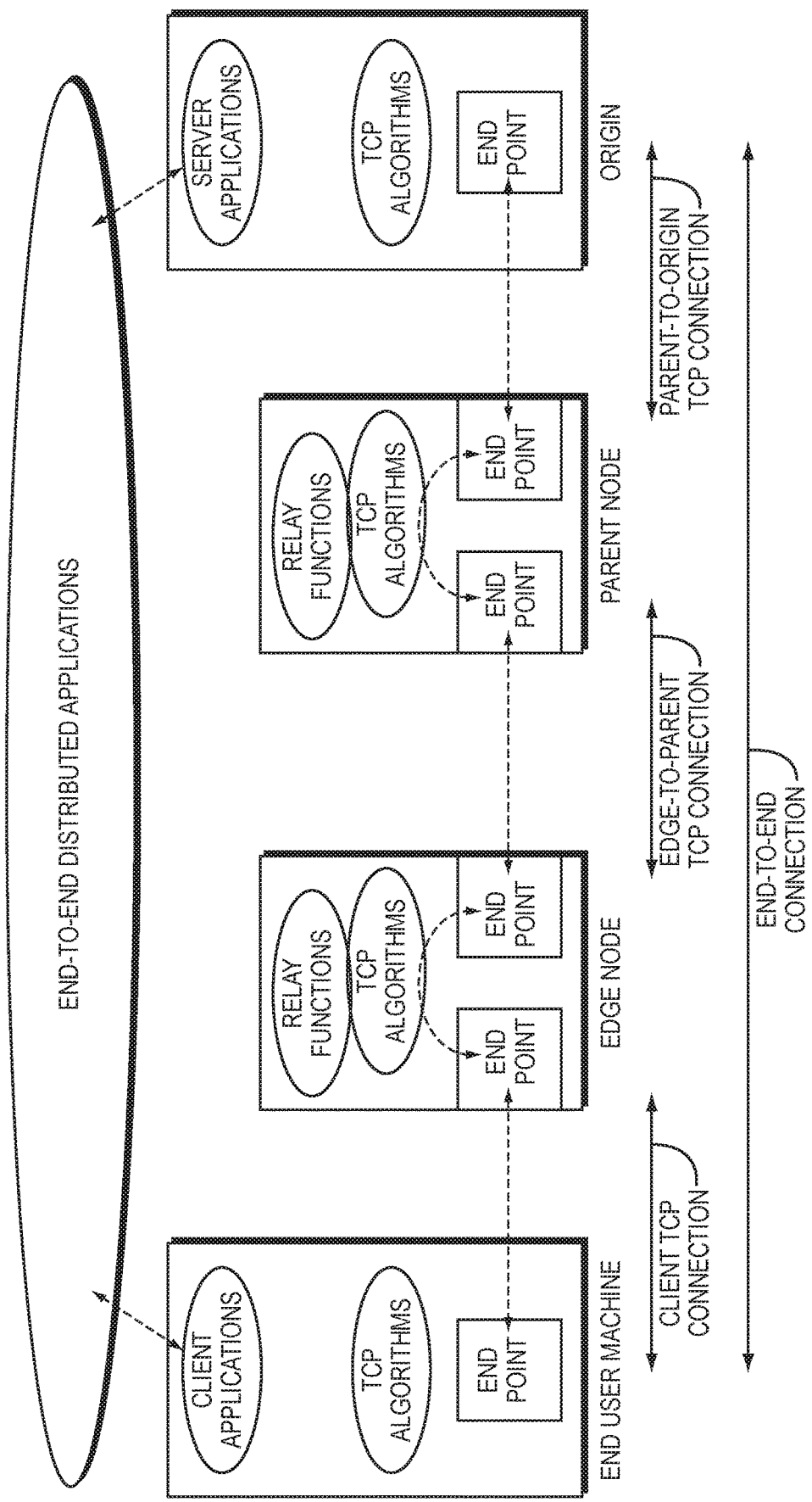
FIG. 9 is a schematic diagram illustrating the teachings hereof in a content delivery network.

FIG. 9 illustrates an example of an arrangement in CDN transport platform with two CDN nodes between the end user client and the origin. It applies to a variety of uses cases most notably the fetching of an object from an origin server (e.g., where the client requests an object from the edge machine, the edge has a cache miss and fetches the object from origin through a parent machine). The arrangement applies also to the overlay data transport function mentioned above (in which the edge node and parent node represent optimally-selected relays in the overlay for improved routing and communication optimization between the client and, for example, a cloud application. In some case, more than two CDN nodes might be intermediaries, and indeed any number is possible.

In a CDN context the nodes are typically proxy servers and may run optimized TCP stacks at the nodes, see e.g., U.S. Pat. Nos. 6,820,133 and 7,020,719, 8,489,670 and US Patent Publication 2013/0304892 the contents of which are hereby incorporated by reference.

Computer Based Implementation

The subject matter described herein is generally implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 10:
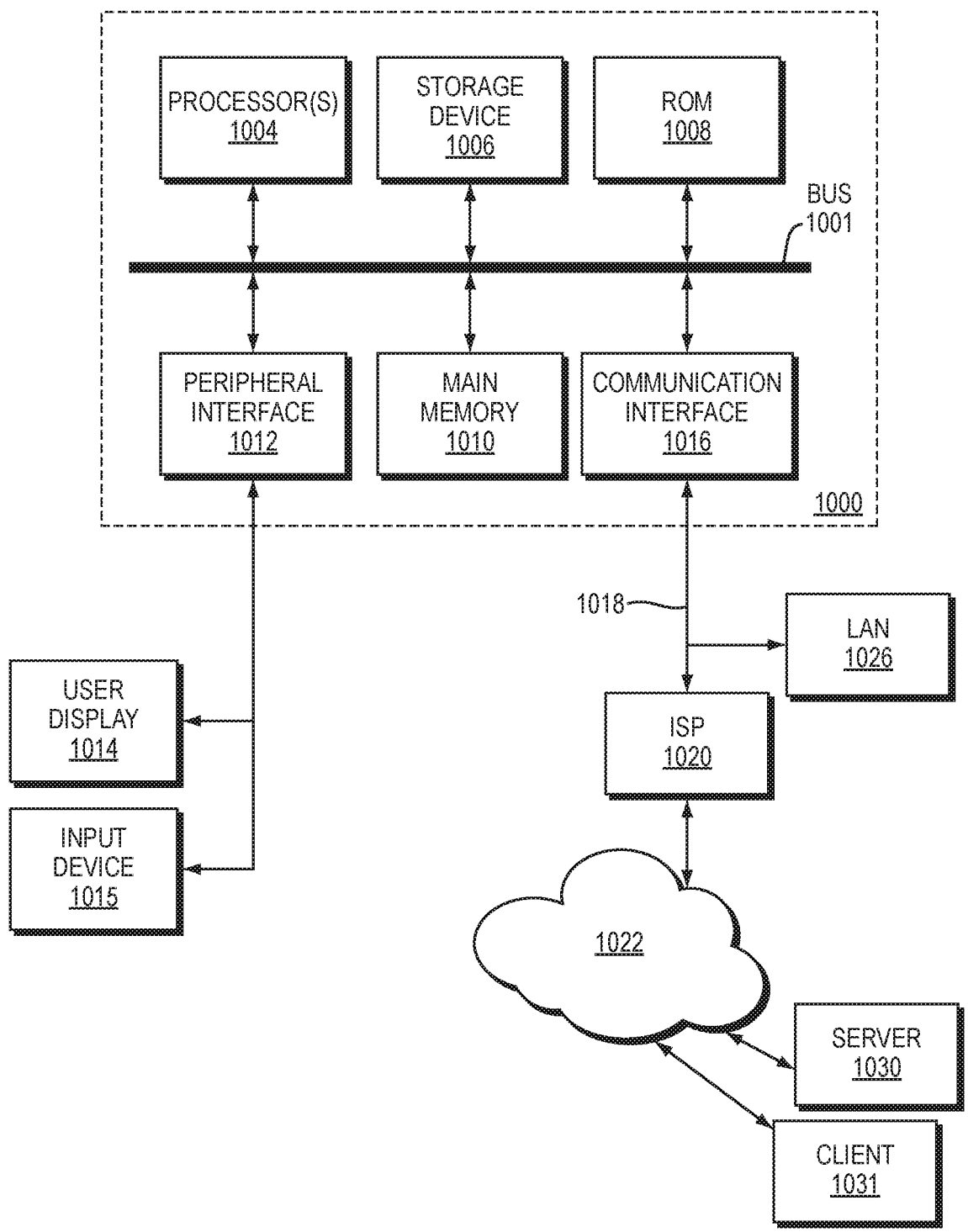
FIG. 10 is a block diagram illustrating hardware in a computer system that may be used to implement the teachings hereof.

FIG. 10 is a block diagram that illustrates hardware in a computer system 1000 on which embodiments of the invention may be implemented. The computer system 1000 may be embodied in a client device, server, personal computer, workstation, tablet computer, wireless device, mobile device, network device, router, hub, gateway, or other device.

Computer system 1000 includes a microprocessor 1004 coupled to bus 1001. In some systems, multiple microprocessor and/or microprocessor cores may be employed. Computer system 1000 further includes a main memory 1010, such as a random access memory (RAM) or other storage device, coupled to the bus 1001 for storing information and instructions to be executed by microprocessor 1004. A read only memory (ROM) 1008 is coupled to the bus 1001 for storing information and instructions for microprocessor 1004. As another form of memory, a non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

Although the computer system 1000 is often managed remotely via a communication interface 1016, for local administration purposes the system 1000 may have a peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry and logic for local buses such as Universal Serial Bus (USB) or other communication links.

Computer system 1000 is coupled to a communication interface 1016 that provides a link between the system bus 1001 and an external communication link. The communication interface 1016 provides a network link 1018. The communication interface 1016 may represent an Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the microprocessor executing program code. Such code may be read from or stored on memory 1010, ROM 1008, or non-volatile storage device 1006, which may be implemented in the form of disks, tapes, magnetic media, CD-ROMs, optical media, RAM, PROM, EPROM, and EEPROM. Any other non-transitory computer-readable medium may be employed. Executing code may also be read from network link 1018 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

In light of the foregoing, those skilled in the art will understand that the teachings hereof provide improvements to the operation and functioning of computer systems and computer networks themselves. In particular, the teachings hereof provide improvements in packet relay efficiency at relay nodes in the split connection and/or split TCP scenario, and may be used to enable faster computer-to-computer communications with less computing cost (e.g., less CPU cycles, less memory use) at relays.

The invention claimed is:

1. A method for relaying packets performed by a host computer, the method comprising:
    (a) providing a host computer that includes:
        (i) network interface hardware having a forwarding table;
        (ii) circuitry forming at least one processor;
        (iii) at least one software process executing on the at least one processor of the host computer;
    (b) with the host computer:
        (i) receiving a packet, via the network interface hardware;
        (ii) providing a group of modes for handling the packet at the forwarding table, the group of modes comprising:
            controller mode, and
            fast mode, and
            branch mode;
        (iii) selecting a mode from the group of modes for handling the packet based on the content of the packet,
        (iv) handling the packet in accord with the selected mode;
        (v) wherein controller mode comprises the forwarding table forwarding the packet to the at least one software process to exercise a relaying function on the packet;
        (vi) wherein branch mode comprises the forwarding table copying the packet to the at least one software process and synchronously relaying the packets to a destination device via the network interface hardware, said relaying performed based on a configuration of the forwarding table.

2. The method of claim 1, further comprising:
selecting the controller mode when the packet comprises a control packet.

3. The method of claim 1, further comprising:
selecting the controller mode when the packet comprises a control packet for any of: TCP connection establishment and TCP connection teardown.

4. The method of claim 1, further comprising:
selecting the controller mode when the packet comprises any of: an out of sequence packet for a TCP flow, a duplicate packet for a TCP flow, an ahead of sequence packet for a TCP flow.

5. The method of claim 1, further comprising:
selecting the fast mode when the packet comprises a UDP packet.

6. The method of claim 1, wherein controller mode comprises the forwarding table forwarding the packet to the at least one software process and the at least one software process determining any of a routing and relay operation for the packet.

7. Computer apparatus for relaying packets, comprising:
    (a) a host computer that includes:
        (i) network interface hardware having a forwarding table;
        (ii) circuitry forming at least one processor;
        (iii) at least one software process executing on the at least one processor of the host computer;

(b) the network interface hardware configured to:
  (i) receive a packet, via the network interface hardware;
  (ii) provide a group of modes for handling the packet at the forwarding table, the group of modes comprising:
    controller mode, and
    fast mode, and
    branch mode;
  (iii) select a mode from the group of modes for handling the packet based on the content of the packet;
  (iv) handle the packet in accord with the selected mode;
  (v) wherein controller mode comprises the forwarding table forwarding the packet to the at least one software process to exercise a relaying function on the packet;
  (vi) wherein branch mode comprises the forwarding table copying the packet to the at least one software process and synchronously relaying the packets to a destination device via the network interface hardware, said relaying performed based on a configuration of the forwarding table.

8. A method for relaying packets performed by a host computer, the method comprising:
  (a) providing a host computer that includes:
    (i) network interface hardware having a forwarding table;
    (ii) circuitry forming at least one processor;
    (iii) at least one software process executing on the at least one processor of the host computer;
  (b) with the host computer:
    (i) receiving a packet over a first TCP connection, via the network interface hardware;
    (ii) providing a group of modes for handling the packet with the forwarding table, the group of modes comprising:
      controller mode, and
      branch mode;
    (iii) selecting a mode from the group of modes for handling the packet based on the content of the packet;
    (iv) handling the packet in accord with the selected mode;
    (v) wherein controller mode comprises the forwarding table forwarding the packet to the at least one software process to exercise a relaying function on the packet;
    (vi) wherein branch mode comprises the forwarding table copying the packet to the at least one software process and synchronously relaying the packets to a destination device over a second TCP connection via the network interface hardware, said second TCP connection being distinct from the first TCP connection, said relaying performed based on a configuration of the forwarding table.

9. The method of claim 8, further comprising:
selecting the controller mode when the packet comprises a control packet for any of: TCP connection establishment and TCP connection teardown.

10. The method of claim 8, further comprising:
selecting the controller mode when the packet comprises any of: an out of sequence packet for a TCP flow, a duplicate packet for a TCP flow, an ahead of sequence packet for a TCP flow.

11. The method of claim 8, further comprising:
selecting the branch mode when the packet comprises an in-sequence packet for a TCP flow.

12. The method of claim 8, the network interface hardware comprising a network interface card.

13. The method of claim 8, further comprising determining, based on the forwarding table, a TCP header change to apply to the packet.

14. The method of claim 13, wherein the TCP header change comprises changing any of: TCP sequence number, TCP acknowledgement number, window size.

15. The method of claim 8, wherein controller mode comprises the forwarding table forwarding the packet to the at least one software process and the at least one software process determining any of a routing and relay operation for the packet.

16. Computer apparatus for relaying packets, comprising:
  (a) a host computer that includes:
    (i) network interface hardware having a forwarding table;
    (ii) circuitry forming at least one processor;
    (iii) at least one software process executing on the at least one processor of the host computer;
  (b) the network interface hardware configured to:
    (i) receive a packet over a first TCP connection, via the network interface hardware;
    (ii) provide a group of modes for handling the packet with the forwarding table, the group of modes comprising:
      controller mode, and
      branch mode;
    (iii) select a mode from the group of modes for handling the packet based on the content of the packet to exercise a relaying function on the packet;
    (iv) handle the packet in accord with the selected mode;
    (v) wherein controller mode comprises the forwarding table forwarding the packet to the at least one software process;
    (vi) wherein branch mode comprises the forwarding table copying the packet to the at least one software process and synchronously relaying the packets to a destination device over a second TCP connection via the network interface hardware, said second TCP connection being distinct from the first TCP connection, said relaying performed based on a configuration of the forwarding table.

* * * * *